(12) United States Patent
Stern

(10) Patent No.: US 6,766,372 B1
(45) Date of Patent: Jul. 20, 2004

(54) SYSTEM AND METHOD FOR ENABLING INTEROPERATION AND PARTNERING AMONG PRODUCTS OVER A NETWORK

(75) Inventor: Thomas A. Stern, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/573,445

(22) Filed: May 16, 2000

(51) Int. Cl.$^7$ .............................. G06F 15/16; H04J 3/24
(52) U.S. Cl. .................... 709/227; 709/205; 370/312
(58) Field of Search ............................ 709/205, 213, 709/227, 228; 370/252, 312

(56) References Cited

U.S. PATENT DOCUMENTS

| | | | |
|---|---|---|---|
| 5,764,915 A | * 6/1998 | Heimsoth et al. | 709/227 |
| 6,195,677 B1 | 2/2001 | Utsumi | 709/201 |
| 6,438,598 B1 | * 8/2002 | Pedersen | 709/227 |
| 6,553,427 B1 | * 4/2003 | Chang et al. | 709/314 |

OTHER PUBLICATIONS

Peterson, et al., *Operating Systems Concepts*, pp. 457–505. (1983).

* cited by examiner

*Primary Examiner*—Krisna Lim
(74) *Attorney, Agent, or Firm*—Ritter, Lang & Kaplan LLP

(57) ABSTRACT

A system and method for enabling interoperation and partnering that permit software application products and/or hardware device products to interoperate over a network such as the Internet in a way unpresupposed by the products are disclosed. The Internet Application Partnering (IAP) system may be implemented in a processor comprising a structure, software, and configuration. The method includes locating an IAPS processor by an originating IAP application, sending an IAP application identification message to the IAPS processor, negotiating the IAPS identification number and field size as well as the sizes of the event code and data field, and event messaging. Event messaging includes transmitting an IAP event message containing an application-specific event code by the originating IAP application to the IAP processor, processing the event message by applying logic of the IAPS configuration to the IAPS structure that define the behavior of the IAPS processor in relation to specific events, and transmitting an IAP message containing an event code to the target IAP application that performs some behavior according to the event code of the IAP protocol message.

32 Claims, 6 Drawing Sheets

IAP Protocol Identification Message Format

IAPP Event Message Format

SYSTEM AND METHOD FOR ENABLING INTEROPERATION AND PARTNERING AMONG PRODUCTS OVER A NETWORK

BACKGROUND OF THE INVENTION

1. Field of the Invention

The present invention relates generally to a system and method for enabling interoperation and partnering among various products over a network. More specifically, a system and method for enabling interoperation and partnering among software applications and/or hardware devices over a network such as the Internet in a way unpresupposed by the application and/or device products are disclosed.

2. Description of Related Art

With the explosive growth of the Internet as well as the increase in computing power and decrease in price of semiconductor chips, a wide spectrum of new, powerful applications have been developed and/or are being contemplated. These new applications provide enhanced capability and associated features for various industries and a wide variety of applications. In particular, these new applications relate to many if not all aspects of modern life: communication among people and organizations, news and entertainment, education and training, shopping, publishing, commerce, banking, investment, medicine, and so on.

Many of these applications are distributed in nature and thus involve networking. Yet, despite the distributed nature and the increased utility of such software application programs and devices, applications typically cannot easily interface, communicate, and interoperate with other applications. This inability to interoperate prevents the various applications from communicating data and/or control information to each other.

For example, it may be desirable for an accounting application package to interface, communicate, and interoperate with an inventory software application package. In such a case, the software developers of each of the software application packages have great shared interest in cooperating and partnering as having interoperation capabilities between the application packages may create a market niche and may enable partnered synergistic marketing for enhanced revenues.

Conventionally, when interoperation between two software application packages and/or devices over a network is desired, a protocol is defined that defines, restricts, and enables interoperation between the programs or devices. The defined protocol method of partnering often requires the addition of features and potential redesign of the application packages.

Other methods of enabling interoperation between two software application packages involve placing the control or intelligence of the interoperation in one of the application packages. However, the placement of control in one of the software packages causes design issues in determining which application package should control which overall function, to what extent, and/or for what purpose. Such issues may result in an iterative software development process of joint features between the interoperating application packages.

As is evident, such conventional methods of partnering are time consuming and usually require upgrading and/or replacing all or a part of one or both of the interoperating products. In addition, the definition of the interface imposes limitations on how the two products may be utilized together, thereby limiting the value of the partnering. Further, as new applications of the partnership are discovered, redesign of the partnership interface may often be required. Thus, the conventional partnering methods not only increase the software development costs but also causes delays in entering the market with an interoperation solution.

One alternative is to establish industry standards for a particular type of interface. However, industry standards often emerge after a technology is already in the market. As such, even with the establishment of industry standards for a particular type of interface, partnering with new technology is thus delayed or prevented.

Therefore, it is desirable to provide a system and method that eliminate these inefficiencies in providing interoperability among applications and/or devices to thereby enable a significant improvement in the deployment of programs capable of interoperating over the Internet.

SUMMARY OF THE INVENTION

A system and method for enabling interoperation and partnering that permit software application and/or hardware device products to interoperate over a network such as the Internet in a way unpresupposed by the products are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described herein.

The system and method for enabling interoperation among products over a network enable rapid establishment of partnerships between two or more software and/or hardware products. The Internet Application Partnering (IAP) system may be implemented in a processor comprising a structure, software, and configuration.

The method for partnering between an originating application and a target application over a network generally comprises transmitting a partnering protocol identification message to a partnering processor by the originating application to negotiate sizes of event code and data field of an originating event message to be transmitted by the originating application to the partnering processor, transmitting at least one originating event message containing an originating event code of the negotiated event code size, processing the originating event message by the partnering processor to generate a target event message having a target event code for transmission to the target application, and transmitting the target event message to the target application to cause an action in the target application in response to the target event message.

The method may further comprise locating the partnering processor by the originating application via the network prior to transmitting the partnering protocol identification message, the locating may include determining an IP address, transport protocol, and port number of the partnering processor. The processing of the originating event message optionally includes applying configuration logic of the partnering processor to the data contained in the originating event message, the configuration logic preferably includes formulations defining the target event code to be generated in response to the originating event code of the originating event message.

The method may further comprise providing a list of originating event codes and/or a list of target event codes, each originating and target event code listing defining an originating or a target application-specific event respectively. The originating event message transmitted may include a data field containing at least one data block extracted by the partnering processor. Each of the originating and target applications can be a software application or hardware device.

In another embodiment, a system for partnering an originating application and a target application over a network generally comprises a partnering processor adapted to receive a partnering protocol identification message and an originating event message from the originating application and to generate and transmit a target event message to the target application in response to the originating event message. The partnering protocol identification message negotiates sizes of event code and data fields of the originating event message to be transmitted by the original application, where the originating event message contains an originating event code of a size equal to the negotiated event code size and where the partnering processor processes the originating event message to generate the target event message containing a target event code to cause an action in the target application in response thereto.

In another embodiment, a system for partnering an originating application and a target application over a network generally comprises a partnering processor adapted to receive a partnering protocol identification message and an originating event message from the originating application and to generate a target event message for transmission to the target application in response to the originating event message, the originating event message containing an originating event code and the target event message containing a target event code. The partnering processor generally comprises a partnering structure for processing and storing data of the originating event message therein, a partnering configuration containing configuration logic, and a partnering software for applying the configuration logic of the partnering configuration on the data stored in the partnering structure to generate the target event message.

The partnering structure may include a partnership identifier to uniquely identify to the partnering processor the partnership between the originating application and the partnering processor, the partnership identifier being determined using the partnering protocol identification message. The partnering structure may also include an identifier record for storing data contained in the partnering protocol identification message and each originating event message. The identifier record includes a pointer to a queue of at least one event record, each event record being created by the partnering processor in response to each originating event message received by the partnering processor. Each event record preferably includes the originating event code contained in the originating event message corresponding to the event record. In addition, at least one event record includes a pointer to a queue of at least one data record, the data record containing at least one data block extracted by the partnering processor from the originating event message.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF SPECIFIC EMBODIMENTS

A system and method for enabling interoperation and partnering that permit software application and/or hardware device products to interoperate over a network such as the Internet in a way unpresupposed by the products are disclosed. The Internet application partnering (IAP) systems permits the developer of each software application or hardware device to define an event-oriented interface without prior knowledge of the partner application or device. The applications may then be interoperated through an intermediary network device or application, such as an IAP system processor. The IAP system processor may be, for example, software implemented as a router feature, e.g., by repurposing existing equipment, or may be a stand-alone device, or implemented as software and deployed on any other suitable platforms.

The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1:
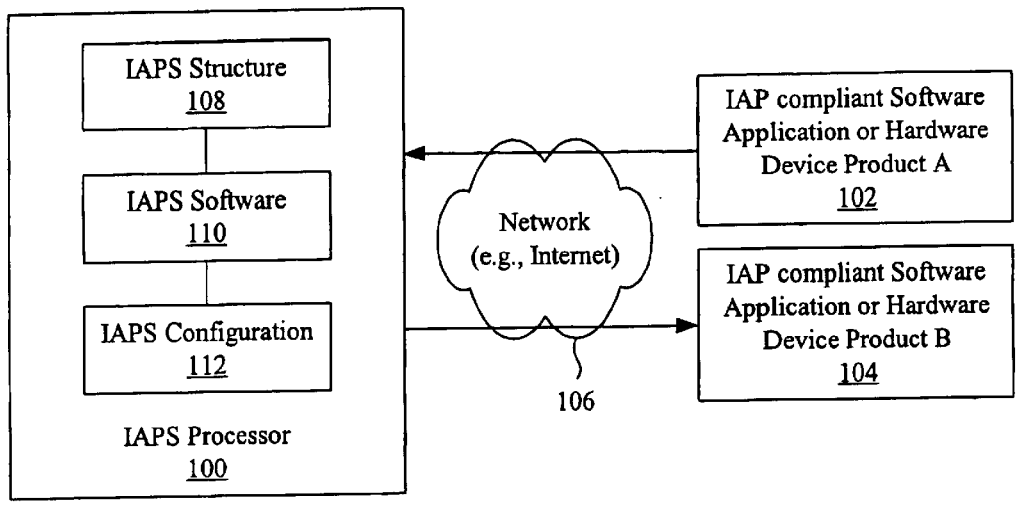
FIG. 1 is a block diagram illustrating a functional overview of an Internet application partnering systems (IAPS) interfacing with two applications.

FIG. 1 is a schematic illustrating a functional overview of the IAP system (IAPS) processor 100 interfacing with two applications 102, 104. Although the partnering system and method are described herein as enabling interoperation between two software applications solely for purposes of clarity and conciseness, it is to be understood that the partnering system and method may be utilized to enable interoperation among any number and any combination of software applications and/or hardware devices. Further, although the partnering system and method are described herein as enabling interoperation over the Internet, it is to be understood that the interoperation may be enabled over any suitable network, such as the Internet, an intranet, or an extranet.

As shown, the IAP processor generally comprises an IAPS structure 108, an IAPS software 110, and an IAPS configuration 112. Each of these will be explained in further detail below.

The IAP system defines an IAP protocol, an adaptive messaging protocol designed to be able to adapted to simple IP (Internet Protocol) devices and to scale to complex distributed IP application. The IAP processor 100 may be software and/or hardware that is notified of events by messages from applications and responds by causing events in other, target application(s).

FIG. 1 illustrates an IAP compliant software application A 102 interoperating to cause another IAP compliant software application B 104 to take some predefined action. An application is IAP compliant if theapplication has specified transmit definition and receive definition. In particular, a transmit definition relates the application-specific events to event message codes in the IAP protocol message and optional data field. In addition, a receive definition relates event message codes in the IAP protocol to actions the application is to perform. Preferably, the transmit and receive definitions for each application are defined by the application developer (or device manufacturer). In addition, the format of the code and the optional data, as will be described in more detail below, is preferably selected by the application from a rich set of alternatives provided by the IAP protocol.

In the example shown in FIG. 1, the software application A 102 transmits an IAP protocol message to the IAPS processor 100 over a network 106 such as the Internet. The IAP protocol message transmitted from software application A 102 contains an event code that specifies an application A specific event and optionally data. The IAP protocol message received by the IAPS processor 100 is processed and stored in the IAPS structure 108. In particular, the IAPS structure 108 preserves the software state of the IAPS processor 100 and acts as a queue to permit multiple IAP protocol messages to be received by the IAPS processor 100 at the same time.

The IAPS software 110 acts upon each of the queued IAP event messages. Depending upon the particular implementation, the IAPS software 110 may be event driven. The IAPS software 110 applies the logic of the IAPS configuration 112 to the IAPS structure 108. In particular, the IAPS configuration 112 may contain formulations or rules such as "when ... then ..." formulations that define the behavior of the IAPS processor 100 in relation to specific events. Depending upon the particulars of implementation, the IAPS configuration 112 may additionally or alternatively contain complex formulations or rules such as a full programming language.

As a result of the application of the logic of the IAPS configuration 112 to the state contained in the IAPS structure 108, the IAPS software 110 may originate an IAP protocol message for transmission to the target IAP compliant software application B 104 via the network 106. As noted above, the message to be transmitted by the IAPS processor 100 to application B 104 contains an event code and an optional data field and the predefined format of the message is preferably defined or selected by the developer of application B 104 from a rich set of formats provided by the IAP protocol. Upon reception of and in response to the message transmitted by the IAP processor 100, application B 104 responds by performing some behavior specified by the receive definition of application B 104.

Utilizing the IAP system and method described herein, applications and/or devices can interoperate in ways unpresupposed by the applications and/or devices. As such, the flexibility of interoperation is extended such that new partnering solutions can be defined in the field. In addition, adapting to new partners and/or new partnering solutions would not generally require redeployment or upgrade of the application software or a replacement or upgrade of the hardware device.

The IAP system and method also enable the interoperation of multiple applications and/or hardware devices. This creates new opportunities for synergy and the creation of enhanced value through partnerships. The IAP system and method enable new technologies to enter into partnerships immediately while bypassing or postponing the need for standard interfaces. Making an application or device IAP compliant offers the opportunity of creating application coalitions such that suites of applications and/or devices can be bundled for partnered use. In addition, IAP compliance simplifies technology acquisition by enabling immediate interoperation among application and devices.

The IAP system and method can also be utilized as a tool for field maintenance to resolve interoperability problems among IAP compliant applications. For example, an IAP configuration solution can be created in the field and used to work around certain types of interoperation problems without modifying the software in any of the applications having interoperating problems. Thus, the IAP system and method decrease both the support costs and the apparent support response time.

Figure 2:
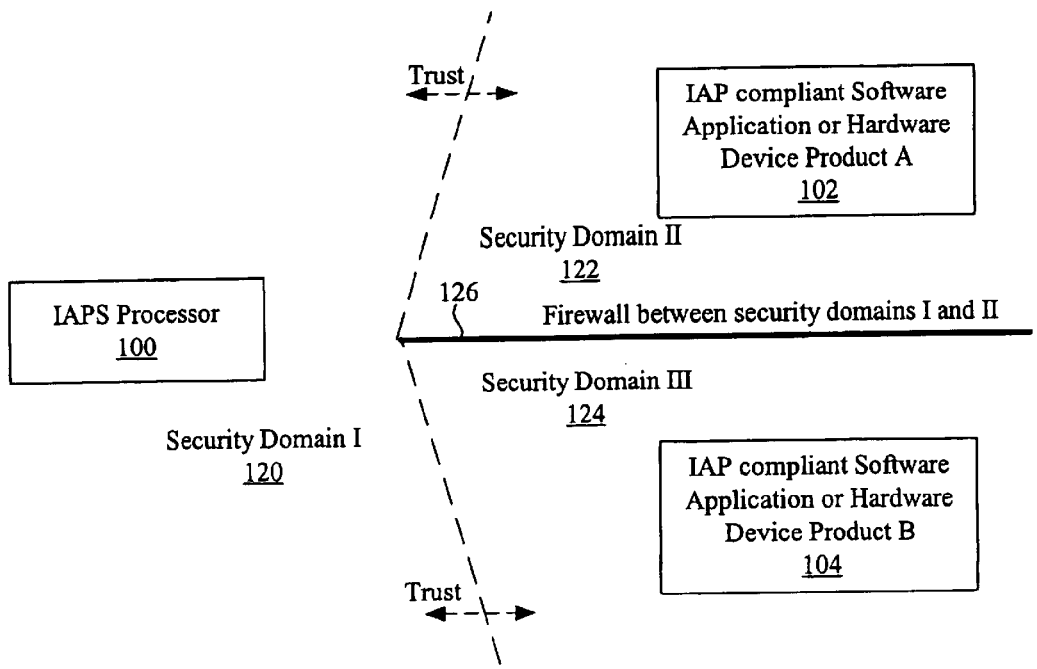
FIG. 2 is a block diagram illustrating an example of the IAPS processor serving as a trusted device between mutually untrusted applications A and B.

Another advantage of the IAP system and method is that the IAP processor 100 may act as a trusted device between mutually untrusted applications. FIG. 2 schematically illustrates an example of the IAPS processor 100 serving as a trusted device between mutually untrusted applications A and B 102, 104. In particular, the IAP processor 100 is located in security domain I 120 while applications A and B 102, 104 are located in security domains II and III 122, 124, respectively. A firewall 126 is erected between security domains II and III 122, 124 as security domains II and III have mutual distrust. As shown by dashed lines, security domain I is mutually trusted by both applications A and B 102, 104.

With the IAPS processor 100 serving as the trusted device, mutually untrusted applications A and B 102, 104 can now interoperate using the IAPS processor 100 as an intermediary without modification of the security policy between the untrusted security domains.

Having the IAPS processor 100 serve as a trusted intermediary device thus provides for faster deployment of new Internet applications and allows the arrangement by a third party of partnerships between untrusted parties that would otherwise not partner.

Figure 3:
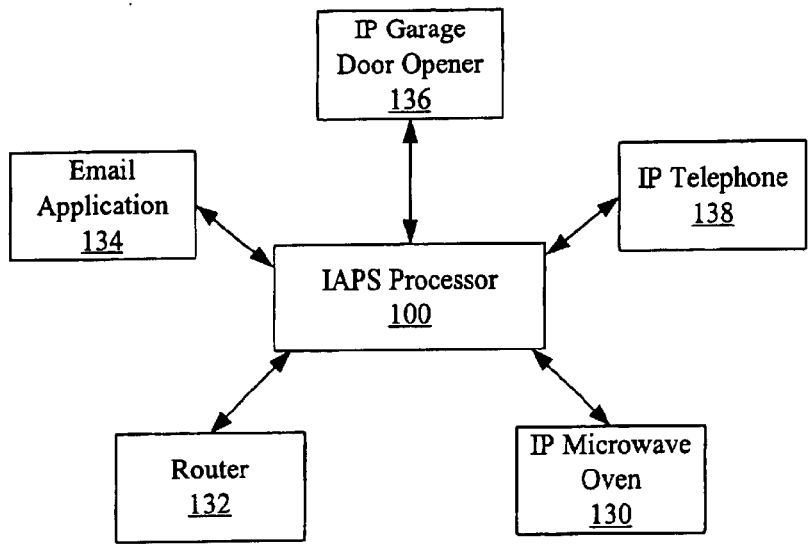
FIG. 3 is a block diagram illustrating an example of a multiple interoperation scheme utilizing the IAPS processor.

FIG. 3 is a block diagram illustrating an example of a multiple interoperation scheme utilizing the IAP processor 100. As shown, the IAP processor 100 is in communication, preferably over a network (not shown), with an IP microwave oven 130, a router 132, an email application 134, an IP garage door opener 136, and an IP telephone 138.

Examples of the possible interoperations of the applications and devices shown in FIG. 3 include:

the receipt of an important email message by the email application 134 could cause the IP telephone 138 to dial a pager;

the loss of line protocol on a serial interface on the router 132 can could cause the IP microwave oven 130 to beep and/or an email to be sent by the email application 134;

a telephone call received by the IP telephone 138 from a specified phone number and/or person could cause the IP garage door opener 136 to open or close the garage door.

As is evident, various combinations of applications and/or devices may interoperate and the interoperation configuration logic may be specified in any desired manner.

The IAP Protocol

Figure 5:
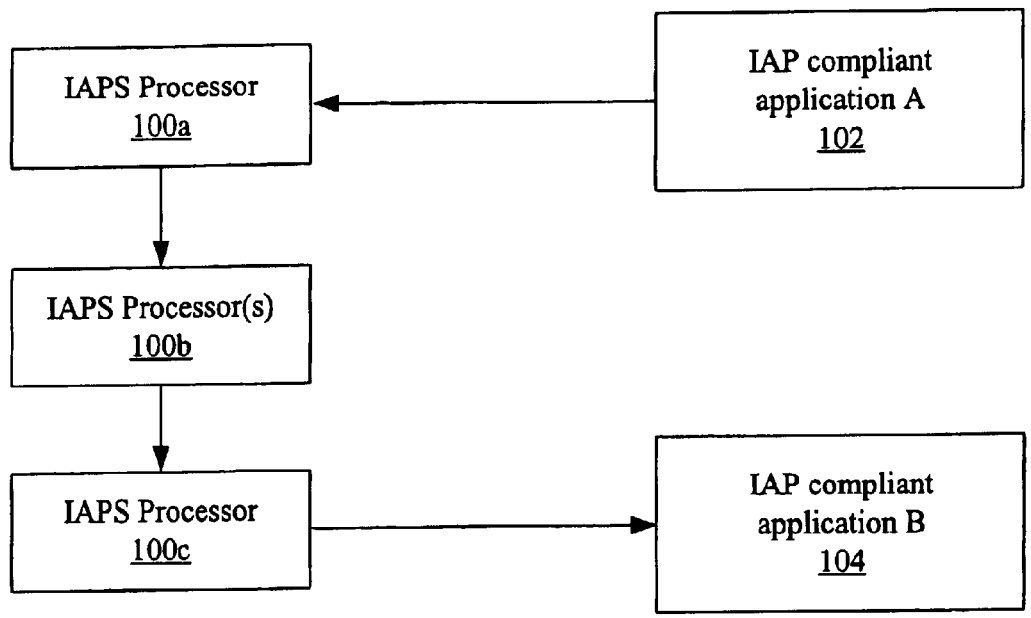
FIG. 5 is a block diagram illustrating an example of the IAPS processor forwarding messages received from an IAP compliant application to one or more intermediate IAPS processors.
Figure 6:
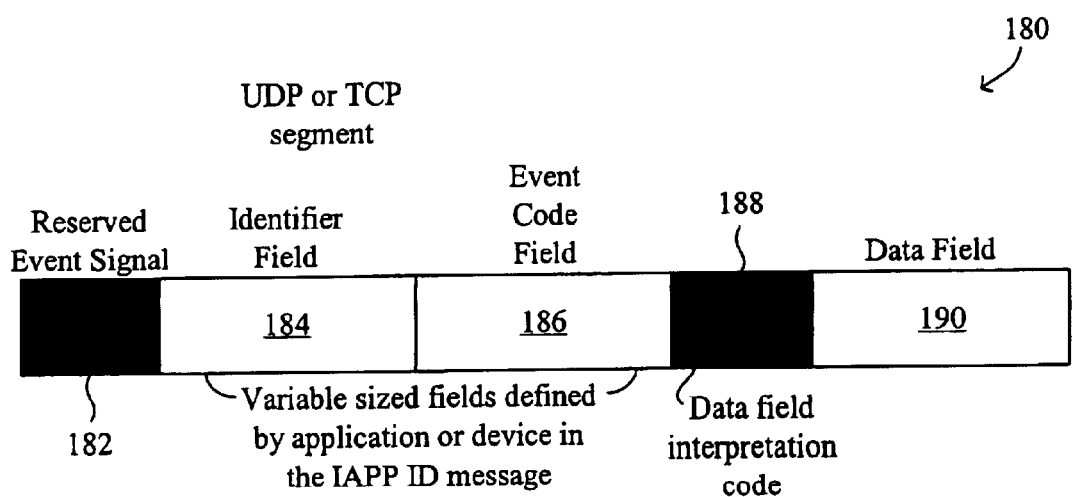
FIG. 6 illustrates an example of the IAP event message format.

A functional overview of the IAPS processor the having been presented above, the IAP protocol utilized by the IAPS processor and the IAP compliant applications will now be described in more detail below with reference to FIGS. 4–6. Specifically, each of the process of locating an IAPS processor, the identification of IAPS compliant application to the IAPS processor, the protocol format negotiation, and event messaging is described below.

An IAP compliant application may locate an IAPS processor such as by using common IP methods. In particular, the IAP processor may be an IP socket application such that it exists in the network at an IP address, uses UDP (User Datagram Protocol), TCP (Transmission Control Protocol), or, less preferably, raw IP transport, and has a UDP or TCP port number. The IAPS processor locating process may include a handshaking process during which both the IAPS processor and the IAP compliant application reconvey their preferred IP addresses, protocols, and ports. Thus, the IP address, transport protocol, and port number of the IAPS processor are determined through the IAPS location process. The IAP processor address, transport mode, and/or port number may be statically configured in an application. In one embodiment, the assigned port number of the IAPS processor may be an international standard, for example. A symbolic name of the IAPS processor can be resolved through DNS (Domain Name Server) lookup.

After locating the IAPS processor, the IAPS compliant application identifies itself to the IAPS processor by, for example, sending an initial identification message. FIG. 4 illustrates an example of the IAP protocol identification message format 150. As shown, the IAP protocol identification message format 150 preferably contains:

the preferred IP address 152, transport method 154, and port number 156 for the IAP compliant application where the transport method may be any of UDP, UDP with response, TCP, or, less preferably, raw IP;

a value 158 that will be used in forthcoming event messages to identify messages as uniquely coming from this IAP compliant application and used to reestablish connection, for example, when an application or device is relocated, such that the relocation does not result in a change in adjacency relationship between the relocated application and the IAPS processor;

a field 160 that defines the size in bits of the identifier that will be used for event message communications;

a field 162 that defines the size in bits of the event code that will be used for event message communications;

a field 164 that defines the size in bits of the data field that will optionally be contained in event messages; and an IAP network independent identifier field 166.

The IAPS identification number and field size as well as the size of the event code and data field may be negotiated. Once defined, these IAP protocol formats typically remain static for the life of the partnership.

After receiving the identification message from the IAP compliant application, the IAPS processor may respond directly to the transmitting IAP compliant application. Alternatively, rather than respond to the identification message from the IAP compliant application, the IAPS processor may elect to forward the message to another IAPS processor, such as an intermediate IAPS processor. FIG. 5 is a block diagram illustrating a scenario where the IAPS processor 100*a* that receives an identification message from the IAP compliant application A 102 forwards the received message to an intermediate IAPS processor 100*b*. The intermediate IAPS processor 100*b* may be the final IAPS processor or may itself be another intermediate IAPS processor and forwards the message toward the final IAPS processor 100*c*. The final IAPS processor 100*c* processes the received identification message from the IAP compliant application. The first and all subsequent intermediate IAPS processors simply act as proxies. Thus, with the use of proxies, more IAPS processors can be included in the network to provide for scalability and to permit the placement of critical IAPS partnerships on devices separate from less critical partnerships to thereby provide security and reliability benefits.

The IAP protocol message format 150 permits the IAP compliant application to redirect the IAPS processor to another address-protocol-port combination IAPS processor. Such a scheme may be utilized on systems that dynamically assign available ports to applications. The redirection permits a proxy device, such as a computer program, to identify new applications being installed in the network to the IAPS processor without requiring the new applications to be able to send the initial identification messages. Thus, the cost of IAP support in applications and devices is reduced.

The IAP protocol message format 150 also allows the IAP compliant application or its proxy to define the size of the identifier, event code, and optional data field in the event message. The selection of the number of bits for the identifier, event code, and data field may depend upon tradeoffs between, on the one hand, the uniqueness in the network as determined by the number of bits in the identifier, the richness of the events in the interface as determined by the number of bits in the event code, and the capacity to transmit data as determined by the number of bits in the data field, and, on the other hand, performance as determined by the message size and the time for the IAPS processor to process larger messages. It is noted that the tradeoff considerations occur between the IAP applications and the IAPS processor rather than between IAP applications. Thus, the IAPS processor serves as the intermediary dedicated to handling a wide range of circumstances whereas the IAP applications are not concerned with the tradeoffs in interfacing with other IAP applications.

For example, the IAP compliant application may define a 4-bit identifier and a 4-bit event code with no data field such that an 8-bit event messaging protocol results to achieve an inexpensive inclusion of IAPS support in low cost applications or devices, such as IAP applications that rely on a dip-switch to set the identifier. An event code field of 4 bits may be defined for an application that has few events, such as may be the case for the garage door opener. As another example, the IAP compliant application may define a 128-bit identifier and a 128-bit event code with a 128-bit data field such that a 384-bit event messaging protocol results to better support complex distributed applications and to enable the provision of rich partnership interfaces.

After the final IAPS processor 100c receives the identification message transmitted by the IAP compliant application A 102, a message is sent from the final (non-proxy) IAPS processor 100c to the target IAP compliant application B 104. Similar to the identification message, the message from the final IAPS processor 100c also adheres to the IAP protocol format 150 described above. However, rather than the location of the IAP compliant application A 102, the message contains the IP address, protocol, and port number of the IAP processor 100c. In addition, rather than the device identifier in the IAP identifier field 166, the IAP identifier field contains the IAPS processor identifier.

The IAP compliant application 104 either may be statically configured with the message from the IAPS processor 100c or may ignore the message from the IAPS processor 100c. Typically, the application 104 utilizes the reconveyed information for all further communications with the IAPS processor 100c.

Some complex applications can use the IAP identifier 166 to distinguish among IAPS processors, thereby permitting the applications to establish multiple IAPS partnerships. The IAPS processor identifier field 166 also allows an IAPS compliant application to partner with IAPS processors in two or more domains. In addition, the IAPS processor identifier field 166 allows complex partnerships to be distributed to multiple IAPS processors and the IAPS compliant application can differentiate among the various partnerships to modify actions. For example, the IP garage door opener could prioritize messages from a local IAPS processor and messages from a remote IAPS processor such that the garage door would open or close based on priority given to the IAPS processor in the home over the IAPS processor at work.

The identification message from IAP compliant application A 102 may be reconveyed at any time in order to refresh the information, for example. This reconveyance would simply be a reconveyance of the address, protocol, and port information. The reconveyance of the identification message can be handled by the IAPS processor by comparing the identification field size and value with a list of previously identified IAP compliant applications. If no similar identification is located, then the IAP compliant applications is determined to be new and a record is created by the IAPS processor. If the IAP compliant application exists, then the event code and data field sizes are checked to ensure they are the same. If the event code and data field sizes have changed, such change indicates that a new IAP compliant application is attempting to identify itself using the same size and value identification as another IAP compliant application and the IAPS processor issues an error message. If the IAP compliant application exists and the event code and data field sizes are the same, then the IP address, protocol, and port are overwritten and all further communications occur with the new values.

Reconveyance of the identification message from the IAP application A 102 allows the IAP compliant application A 102 to be restarted on a host that dynamically assigns port numbers and enables resumption of the partnership. This permits software upgrade of the IAP application without interrupting partnerships and supports restart and reboot of the IAP compliant application. In addition, the IAP application using DHCP (Dynamic Host Configuration Protocol) address resolution can be moved from one location to another in the Internet space without interrupting partnerships.

The IAPS processor identification message from the IAPS processor 100c to the IAP application B 104 may also be reconveyed at any time. Upon receipt of a reconveyed IAPS processor identification message, the IAP application 104 immediately begins sending all event messages to the new address-protocol-port combination specified in the retransmitted IAPS processor identification message. However, it is noted that low cost statically configured devices would require manual reconfiguration.

The reconveyance of the message from the IAPS processor 100c to the IAP compliant application B 104 allows the IAPS processor to be restarted and assigned a new IP address and/or port number without losing partnerships with IAP applications, assuming the partnership identifications stored by the IAPS processor 100c are checkpointed and recovered. The reconveyance also allows the IAPS processor to be moved within the network, replaced, or upgraded. It is noted that once an IAP application is installed in the network, it is preferably the responsibility of the IAPS processor to maintain the IAP application identification information in a non-volatile manner. This permits the IAPS processor to be replaced and the partnerships to be recovered without further messaging between the IAPS processor and the IAP application. If the checkpoint or backup of identification information is lost, then the IAP applications must retransmit the identification messages to the IAPS processors.

As noted above, the transport method may be any of UDP, UDP with response, TCP, or, less preferably, raw IP. The IP transport method allows the provision of a simplified IAPS processor for very low cost applications and devices that cannot support UDP or TCP but can only support IP. In UDP with response, the IAPS processor sends an acknowledgement (ACK) message which acknowledge the receipt of the message. The IAP application sets a timer upon transmission and waits for the ACK message. If the IAP application does not receive an ACK response prior to the expiration of the timer, the IAP application assumes that the message was dropped or was received in error and automatically retransmits the message. The IAP application may also maintain a counter for each message such that after a threshold number of retransmissions, the IAP application can resend the identification message in order to locate a new IAPS processor.

Event Message Format

Figure 4:
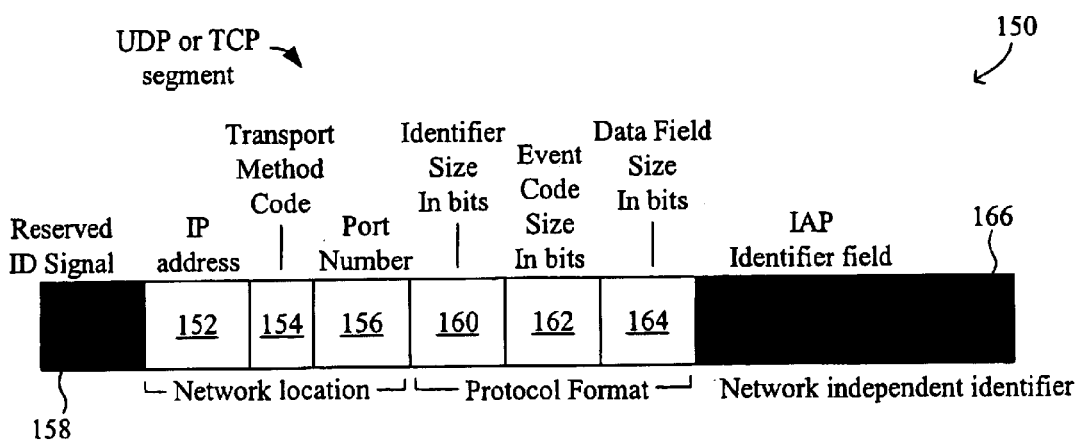
FIG. 4 illustrates an example of the Internet application partnering (IAP) protocol identification message format.

Once the IAPS processor has been located, the IAP compliant application identified to the IAPS processor, and the protocol format negotiated between the IAP application and the IAPS processor, event messaging from the IAP application to the IAPS processor may begin. FIG. 6 illustrates an example of the IAP event message format 180. The IAP protocol event message format preferably contains:

- a reserved event signal value 182 corresponding to the reserved identification signal 158 of the identification message format 150 (as shown in FIG. 4) used to identify messages as uniquely coming from a particular IAP application and to reestablish connection;
- an identifier 184 having a size in bits as specified by the identifier size in bits field 160 of the identification message format (as shown in FIG. 4);
- an event code 186 having a size in bits as specified by the event code size in bits field 162 of the identification message format (as shown in FIG. 4);
- a data field interpretation code 188; and
- a data field 190 having a size in bits as specified by the data field size in bits field 164 of the identification message format (as shown in FIG. 4).

Event Code 186

The event code 186 is an IAP application-specific code. The event code 186 allows the creation of scripts in the IAPS processor configuration to enable the useful interoperation between IAP applications and/or devices.

The definition of the IAP application-specific event code 186 is preferably published or otherwise made available for the IAP application. The event code definition generally includes the definition of each event code that is sent by the IAP application and definition of each event code that is received by the IAP application. In particular, the definition of each event code that is sent by the IAP application includes the meaning of the code, the conditions under which the code is sent, and/or the existence, format, valid range of values of associated data, if any, that is sent. In addition, definition of each event code that is received by the IAP application includes the action to be taken when the code is received, the conditions under which the action will be successful and/or unsuccessful, and/or the format and valid range of values of associated data, if any, that is required to be sent with the event code.

Data Field Interpretation Code 188 and Data Field 190

The data field interpretation code 188 is preferably defined by the IAP protocol to determine how the data field is processed in creating data items in the IAPS structure that are then accessible to the IAPS configuration logic. As the data field is optional and may have a size of 0 bits, a data field interpretation code value, such as x00, is preferably reserved to indicate that no data field is present. An event message without a data field permits the IAP application to send short, expedited messages for events and eliminates unnecessary transmissions of filler data bits for events without data associated therewith.

In one preferred embodiment, the data field interpretation process utilizes a method for extracting variables from the data field. Generally, the data field interpretation process may extract as many blocks of the size defined by the data field interpretation code from the data field and fills the last block with high order zero bits. For example, a data field interpretation code value of x02 may indicate a 16-bit integer and the data field may have been set by the application to 10 bits. In such a case, the IAPS processor stuffs or inserts six bits of zeros into the data field's six most significant bit positions to create a standard 16-bit value. As another example, where the IAP application declared a 33-bit data field, the IAPS processor would extract two 16-bit blocks from the first 32 bits of the data field. The final bit would have 15 high-order zero bits inserted such that the IAPS processor would extract a third 16-bit block from the data field.

The above-described dynamic formatting permits the IAP application to transmit any number of data blocks in the data field 190 of the event message 180. The data field interpretation code may be utilized to define each data block to be an integer, a string, a binary number, or a date-time-stamp, for example. Preferably, the IAPS configuration script is utilized to determine which type of data blocks, if any, and to perform logical manipulations based on the data field based on the type of data blocks.

IAP Processor Components: IAPS Structure, Software, and Configuration

As discussed above, the IAP processor 100 generally comprises the IAPS structure, the IAPS software, and the IAPS configuration. Each of these components will be described in more detail below with reference to FIGS. 7–8.

Figure 7:
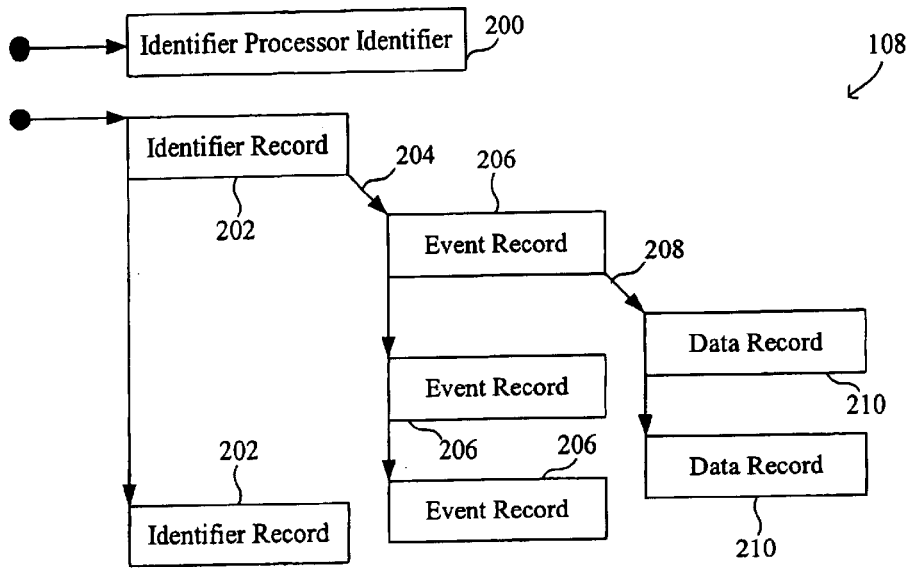
FIG. 7 schematically illustrates the contents of the IAPS structure.

FIG. 7 schematically illustrates the contents of the IAPS structure 108. The IAPS structure 108 generally includes an IAPS processor identifier 200, a chain of identifier records 202, created or modified when an IAP protocol identification message is received and processed. As noted above, the IAPS processor identifier 200 may be utilized in the IAP protocol identification messages and enables IAP applications to be in partnerships with multiple IAPS processors.

Each identifier record 202 uniquely identifies an IAP application or device and contains information fields and an event queue pointer 204 pointing to an element in a queue of event records 206. Each event record is created when an IAP protocol event message is received and processed and each event record contains a data queue pointer 208 pointing to an element in a queue of data records 210. The data records 210 contain data blocks extracted from processing of the data, if any, in the data field of the received event messages.

In one embodiment, the IAPS processor is a state machine that cascades over a list of identifiers and processes messages received from each IAP application. The event records 206 may be processed in the order received and may be discarded by the IAP structure 108 upon processing. Various features may be implemented in the IAPS structure 108 such as the maintenance of history, the maintenance of state information by modifying the records, and/or management of the depth of the event and/or data queues 206, 210.

Figure 8:
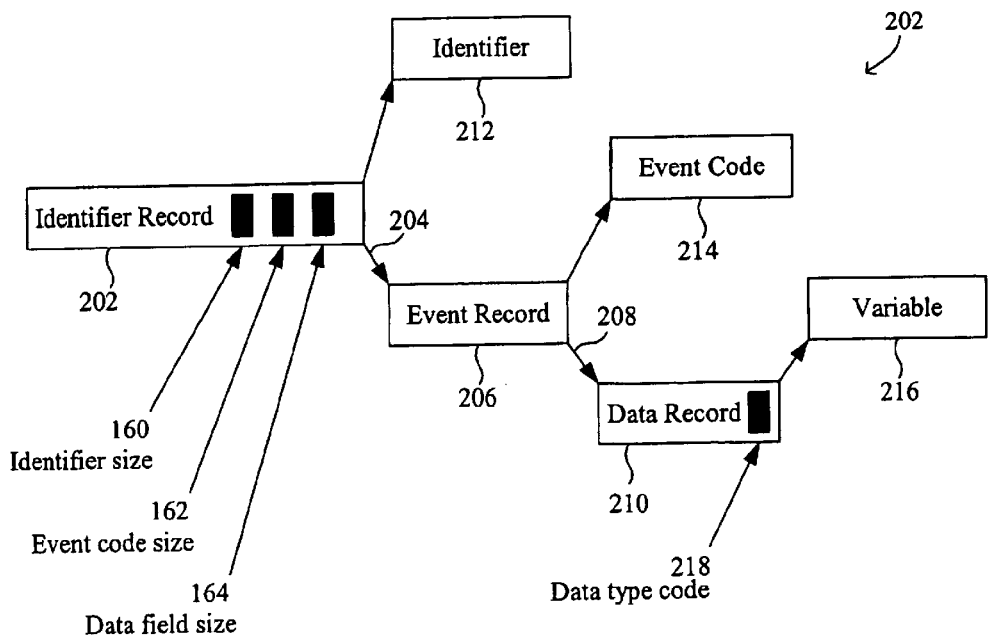
FIG. 8 is a block diagram illustrating an identifier record in more detail.

FIG. 8 is a block diagram illustrating each identifier record 202 in more detail. As shown, the identifier record 202 contains the sizes of the identifier, event code, and data field, as defined by the IAP protocol identification message transmitted by the IAP application as described above. The sizes of the identifier, event code, and data field are preferably static for the life of the partnership between the IAPS processor and the IAP application.

As shown, the identifier record 202 may point to an IAP application identifier data object 212 that can be read and manipulated by a library of variable-length equipped functions. In addition, the event record points to an event code data object 214.

The data record 210 points to data blocks or variable(s) 216 generated by the processing of the optional data field of the IAP protocol event message. The data type code that the IAP application transmits in the event message indicates what kind of data blocks or variables are to be extracted from the optional data field. In one embodiment, the data type code specifies one variable type of fixed length and the IAPS processor extracts as many of these data blocks from the data field as possible and filling the most significant bits of the last data block with 0 bits as necessary, as described above. Each data record stores the data type code 218 to permit the configuration language to verify the type of data contained in the data blocks or variables 216.

Figure 9:
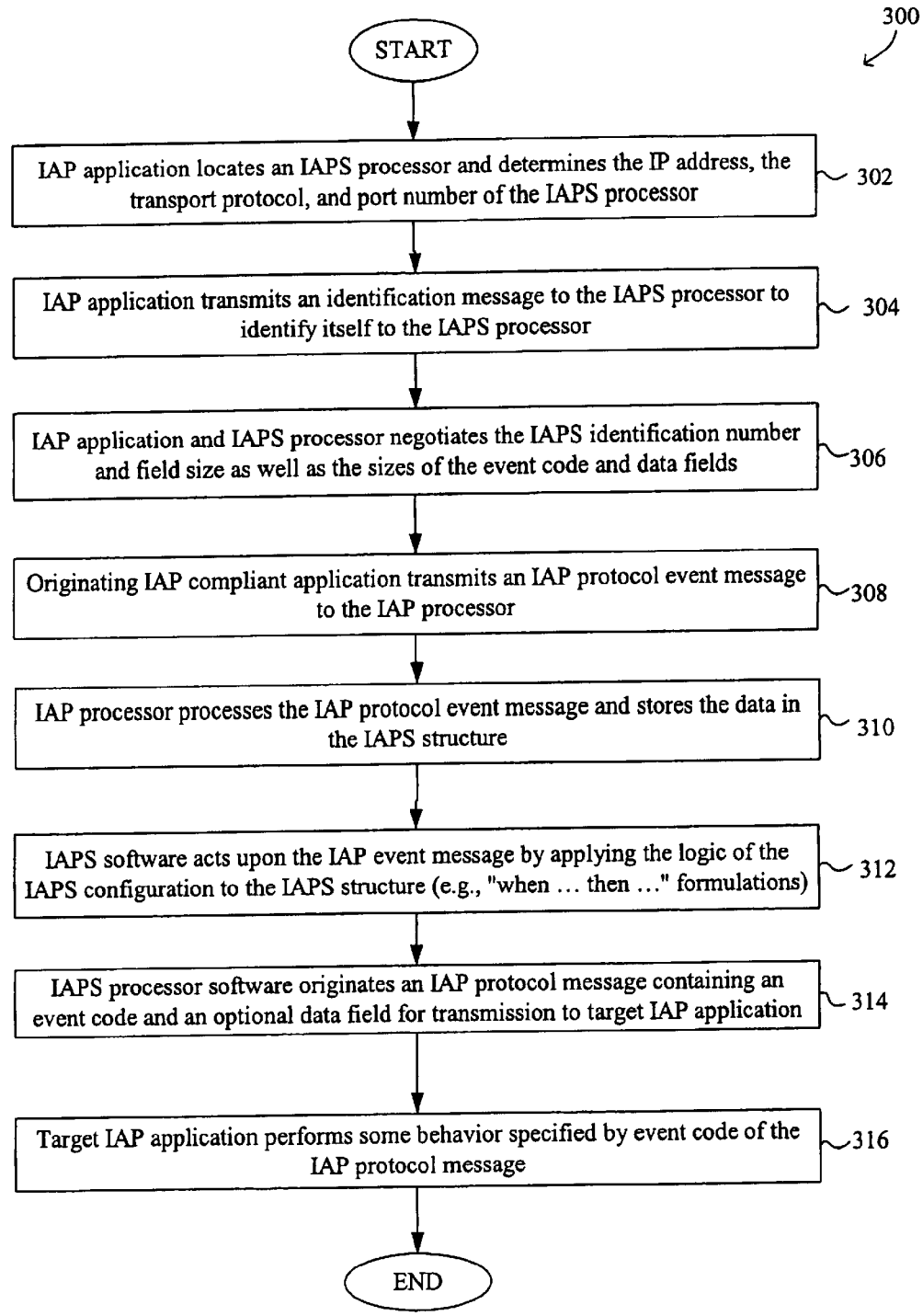
FIG. 9 is a flow chart illustrating the method 300 for enabling interoperation among IAP applications over a network such as the Internet.

FIG. 9 is a flow chart illustrating the method 300 for enabling interoperation among IAP applications over a network such as the Internet. At step 302, the IAP application locates an IAPS processor such as by using common IP methods and determines the IP address, the transport protocol, and port number of the IAPS processor. Step 302 may also include a handshaking process.

At step 304, the IAP application sends an identification message to the IAPS processor to identify itself to the IAPS processor. At step 306, the IAP application and IAPS processor negotiate the IAPS identification number and field size as well as the sizes of the event code and data field. Once defined, these IAP protocol formats typically remain static for the life of the partnership between the IAP application and the IAPS processor.

Event messaging begins at step 308 with the originating IAP compliant application transmitting an IAP protocol event message to the IAP processor over a network such as the Internet. The IAP protocol message transmitted from IAP application contains an event code that specifies an application-specific event and optionally data.

At step 310, the IAP processor processes the event message and stores the data in the IAPS structure. The IAPS structure preferably preserves the software state of the IAPS processor and acts as a queue to permit multiple IAP protocol event messages to be received and processed.

Next, at step 312, the IAPS software acts upon the queued IAP event message by applying the logic of the IAPS configuration to the IAPS structure such as using "when . . . then . . . " formulations that define the behavior of the IAPS processor in relation to specific events. For example, a "when . . . then" formulation may define that if the queued IAP event message acted upon by the IAPS software indicates that event X is TRUE (or FALSE), the IAPS processor transmits a predefined message such as a message to machine Y to execute event Z. As another example, a "when . . . then" formulation may define that if the queued IAP event message acted upon by the IAPS software indicates that an awaiting response time exceeds a maximum time for response, the IAPS processor transmits an error message. In addition, depending upon the particulars of implementation, the IAPS configuration may additionally or alternatively contain complex formulations or rules such as a full programming language.

At step 314, the IAPS processor software originates an IAP protocol message containing an event code and an optional data field for transmission via the network to the target IAP application. At step 316, in response to the IAP protocol message received from the IAPS processor, the target IAP application performs some behavior specified by event code of the IAP protocol message. As is evident, further interoperation between the originating IAP application and the target IAP application may be performed by repeating steps 308 to 316.

Figure 10:
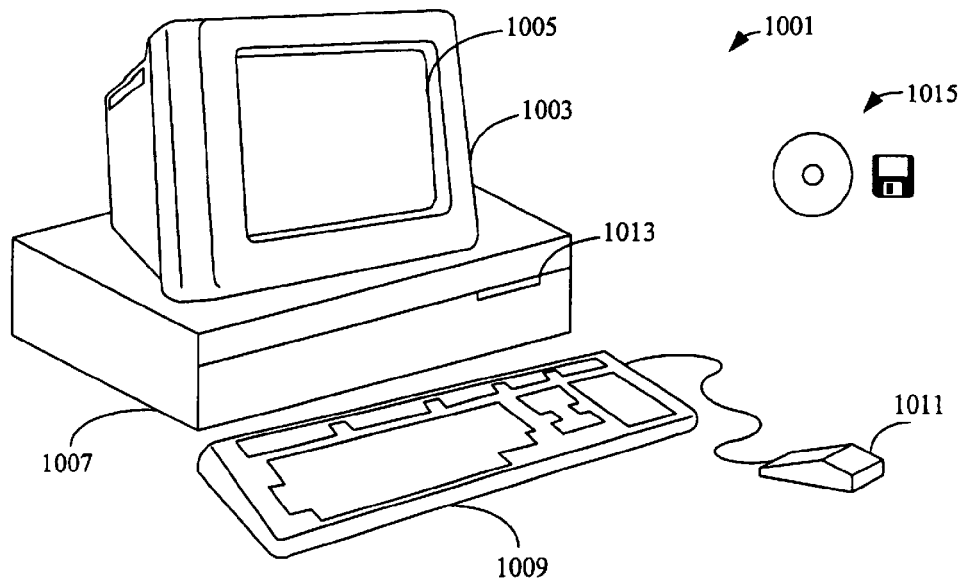
FIG. 10 illustrates an example of a computer system that can be utilized with the various embodiments of method and processing described herein.
Figure 11:
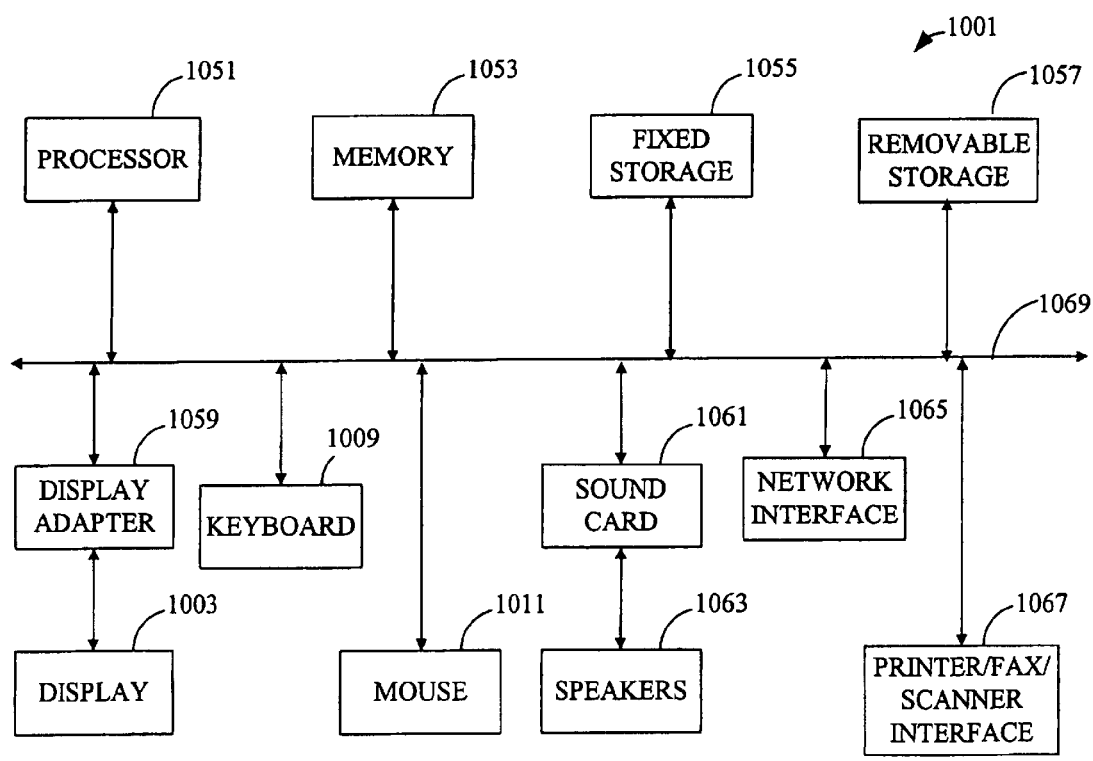
FIG. 11 illustrates a system block diagram of the computer system of FIG. 10.

FIGS. 10 and 11 illustrate a schematic and a block diagram, respectively, of an example of a general purpose computer system 1000 suitable for executing software programs that implement the methods and processes described herein. The architecture and configuration of the computer system 1000 shown and described herein are merely illustrative and other computer system architectures and configurations may also be utilized.

The illustrative computer system 1000 includes a display 1003, a screen 1005, a cabinet 1007, a keyboard 1009, and a mouse 1011. The mouse 1011 can have one or more buttons for interacting with a GUI (graphical user interface) that may be displayed on the screen 1005. The cabinet 1007 typically house one or more drives to read a computer readable storage medium 1015, system memory 1053, and a hard drive 10155, any combination of which can be utilized to store and/or retrieve software programs incorporating computer codes that implement the methods and processes described herein and/or data for use with the software programs, for example. Examples of computer or program code include machine code, as produced, for example, by a compiler, or files containing higher level code that may be executed using an interpreter.

Computer readable media may store program code for performing various computer-implemented operations and may be encompassed as computer storage products. Although a CD-ROM and a floppy disk 1015 are shown as exemplary computer readable storage media readable by a corresponding CD-ROM or floppy disk drive 1013, any other combination of computer readable storage media can be utilized. Computer readable medium typically refers to any data storage device that can store data readable by a computer system. Examples of computer readable storage media include tape, flash memory, system memory, and hard drive may alternatively or additionally be utilized. Computer readable storage media may be categorized as magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. Further, computer readable storage medium may also encompass data signals embodied in a carrier wave, such as the data signals embodied in a carrier wave carried in a network. Such a network may be an intranet within a corporate or other environment, the Internet, or any network of a plurality of coupled computers such that the computer readable code may be stored and executed in a distributed fashion.

Computer system 1000 comprises various subsystems. The subsystems of the computer system 1000 may generally include a microprocessor 1051, system memory 1053, fixed storage 1055 (such as a hard drive), removable storage 1057 (such as a CD-ROM drive), display adapter 1059, sound card 1061, transducers 1063 (such as speakers and microphones), network interface 1065, and/or scanner interface 1067.

The microprocessor subsystem 1051 is also referred to as a CPU (central processing unit). The CPU 1051 can be implemented by a single-chip processor or by multiple processors. The CPU 1051 is a general purpose digital processor which controls the operation of the computer system 1000. Using instructions retrieved from memory, the CPU 1051 controls the reception and manipulation of input data as well as the output and display of data on output devices.

The network interface 1065 allows CPU 1051 to be coupled to another computer, computer network, or telecommunications network using a network connection. The CPU 1051 may receive and/or send information via the network interface 1065. Such information may include data objects, program instruction, output information destined to another network. An interface card or similar device and appropriate software implemented by CPU 1051 can be used to connect the computer system 1000 to an external network and transfer data according to standard protocols. In other words, methods and processes described herein may be executed solely upon CPU 1051 and/or may be performed across a network such as the Internet, intranet networks, or LANs (local area networks), in conjunction with a remote CPU that shares a portion of the processing. Additional mass storage devices (not shown) may also be connected to CPU 1051 via the network interface 1065.

The subsystems described herein are merely illustrative of the subsystems of a typical computer system and any other suitable combination of subsystems may be implemented and utilized. For example, another computer system may also include a cache memory and/or additional processors 1051, such as in a multi-processor computer system.

The computer system 1000 also includes a system bus 1069. However, the specific buses shown are merely illustrative of any interconnection scheme serving to link the various subsystems. For example, a local bus can be utilized to connect the central processor to the system memory and display adapter.

The IAP system and method for enabling interoperation and partnering among IAP applications over a network in a way unpresupposed by the IAP applications permit partnering among applications for which partnering was not contemplated without redesigning and reconfiguring the applications. The IAPS allows the interoperation among applications in mutually secure domains without modification of the firewall or security policies among the various security domains. The IAPS also permits network and application events to be integrated to provide Internet solutions that cross OSI layer boundaries. The IAPS supports applications ranging from small, inexpensive devices such as an IP connection on a light switch to complex applications such as a distributed database system. The IAPS may be deployed as feature implemented in an IAPS processor or by providing an application-specific interface into a device such as a router or a switch.

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. A method for operating a partnering processor to partner between an originating application and a target application over a network, comprising:
   receiving a partnering protocol identification message from the originating application for negotiating an event message protocol of an originating event message to be transmitted by the originating application to the partnering processor;
   receiving at least one originating event message, the originating event message conforming to the event message protocol;
   processing the originating event message to generate a target event message for transmission to the target application, wherein each of the originating and the target applications is selected from a software application and hardware device; and
   transmitting the target event message to the target application to cause an action in the target application in response to the target event message.

2. The method of claim 1, wherein processing includes applying configuration logic of the partnering processor to data contained in the originating event message.

3. The method of claim 2, wherein the target event message includes a target event code and wherein the configuration logic includes formulations defining the target event code to be generated by the partnering processor in response to the originating event code of the originating event message.

4. The method of claim 1, wherein the originating event message contains an originating event code, the method further comprising providing a list of originating event codes specific to the originating application, each originating event code defining an originating application-specific event.

5. The method of claim 1, wherein the target event message includes a target event code, the method further comprising providing a list of target event codes specific to the target application, each target event code listing defining a corresponding target application-specific event action to be performed by the target application in response to the target event message.

6. A method for operating a partnering processor to partner between an originating application and a target application over a network, comprising:
   receiving a partnering protocol identification message from the originating application for negotiating an event message protocol of an originating event message to be transmitted by the originating application to the partnering processor;
   receiving at least one originating event message, the originating event message conforming to the event message protocol, wherein the originating event message includes an event code and wherein the event message protocol includes size of event code, the originating event code being of a size equal to the event code size;
   processing the originating event message to generate a target event message for transmission to the target application; and
   transmitting the target event message to the target application to cause an action in the target application in response to the target event message.

7. A method for operating a partnering processor to partner between an originating application and a target application over a network, comprising:
   receiving a partnering protocol identification message from the originating application for negotiating an event message protocol of an originating event message to be transmitted by the originating application to the partnering processor, wherein the event message protocol includes size of data field and wherein the originating event message transmitted by the originating application includes a data field containing at least one data block extracted by the partnering processor, each extracted data block having a size equal to the negotiated data field size;
   receiving at least one originating event message, the originating event message conforming to the event message protocol;
   processing the originating event message to generate a target event message for transmission to the target application; and
   transmitting the target event message to the target application to cause an action in the target application in response to the target event message.

8. A method for operating a partnering processor to partner between an originating application and a target application over a network, comprising:
   receiving a partnering protocol identification message from the originating application for negotiating an event message protocol of an originating event message to be transmitted by the originating application to the partnering processor;
   receiving at least one originating event message, the originating event message conforming to the event message protocol;
   processing the originating event message to generate a target event message for transmission to the target application;
   transmitting the target event message to the target application to cause an action in the target application in response to the target event message; and
   using the originating application to locate the partnering processor via the network prior to receiving the partnering protocol identification message.

9. The method of claim 8, wherein using the originating application to locate the partnering process comprises determining an IP address, transport protocol, and port number of the partnering processor.

10. A system for partnering an originating application and a target application over a network, comprising:

a partnering processor adapted to receive a partnering protocol identification message over the network and an originating event message from the originating application over the network and to generate and transmit a target event message to the target application over the network in response to the originating event message, wherein the partnering protocol identification message negotiates an event message protocol for the originating event message to be transmitted by the original application to the partnering processor and the partnering processor processes the originating event message to generate the target event message for causing an action in the target application in response to the target event message, wherein the originating event message includes an event code and the event message protocol includes size of event code, the originating event code being of a size equal to the event code size.

11. A system for partnering an originating application and a target application over a network, comprising:

a partnering processor adapted to receive a partnering protocol identification message over the network and an originating event message from the originating application over the network and to generate and transmit a target event message to the target application over the network in response to the originating event message, wherein the partnering protocol identification message negotiates an event message protocol for the originating event message to be transmitted by the original application to the partnering processor and the partnering processor processes the originating event message to generate the target event message for causing an action in the target application in response to the target event message, wherein the event message protocol defines a size of data field and the partnering processor is adapted to extract data blocks from a data field of the originating event message, each extracted data block having a size equal to the negotiated data field size.

12. A system for partnering an originating application and a target application over a network, comprising:

a partnering processor adapted to receive a partnering protocol identification message over the network and an originating event message from the originating application over the network and to generate and transmit a target event message to the target application over the network in response to the originating event message, wherein the partnering protocol identification message negotiates an event message protocol for the originating event message to be transmitted by the original application to the partnering processor and the partnering processor processes the originating event message to generate the target event message for causing an action in the target application in response to the target event message, wherein the originating application is configured to transmit the partnering protocol identification message and the originating event message to the partnering processor, the originating event message containing an originating event code corresponding to an event of the originating application.

13. The system of claim 12, wherein the originating application includes a list of originating event codes, each originating event code defining an originating application-specific event.

14. The system of claim 12, wherein the originating application is selected from one of a software application and a hardware device.

15. A system for partnering an originating application and a target application over a network, comprising:

a partnering processor adapted to receive a partnering protocol identification message over the network and an originating event message from the originating application over the network and to generate and transmit a target event message to the target application over the network in response to the originating event message, wherein the partnering protocol identification message negotiates an event message protocol for the originating event message to be transmitted by the original application to the partnering processor and the partnering processor processes the originating event message to generate the target event message for causing an action in the target application in response to the target event message, wherein the target application is configured to receive the target event message from the partnering processor and the target event message contains a target event code corresponding to an action to be performed by the target application.

16. The system of claim 15, wherein the target application includes a list of target event codes, each target event code defining a target application-specific event.

17. The system of claim 15, wherein the target application is selected from one of a software application and a hardware device.

18. A system for partnering an originating application and a target application over a network, comprising:

a partnering processor adapted to receive a partnering protocol identification message over the network and an originating event message from the originating application over the network and to generate and transmit a target event message to the target application over the network in response to the originating event message, wherein the partnering protocol identification message negotiates an event message protocol for the originating event message to be transmitted by the original application to the partnering processor and the partnering processor processes the originating event message to generate the target event message for causing an action in the target application in response to the target event message, wherein the partnering processor includes a partnering configuration containing configuration logic to be applied to data contained in the originating event message.

19. The system of claim 18, wherein the target event message contains a target event code and wherein the configuration logic includes formulations defining the target event code to be generated by the partnering processor in response to the originating event code of the originating event message.

20. A system for partnering an originating application and a target application over a network, comprising:

a partnering processor adapted to receive a partnering protocol identification message over the network from the originating application, said partnering protocol identification message negotiating an event message protocol between the partnering processor and the originating application, the partnering processor further adapted to receive an originating event message over the network from the originating application and to generate a target event message for transmission over the network to the target application in response to the originating event message, a computer-readable storage medium coupled to the partnering processor and having stored thereon:

a partnering structure for processing and storing data of the originating event message therein, a partnering configuration containing configuration logic, and partnering software for applying the configuration logic of the partnering configuration on the data stored in the partnering structure to generate the target event message.

21. The system of claim 20, wherein the originating event message includes an originating event code and wherein the partnering configuration contains formulations defining response of the partnering processor to the originating event code contained in the originating event message.

22. The system of claim 20, wherein the event message protocol defines an event code size and wherein the originating event message to be transmitted by the original application to the partnering processor includes an event code of a size equal to the negotiated event code size.

23. The system of claim 20, wherein the target event message contains a target event code for causing an action in the target application in response thereto, the target event code being generated in response to the originating event message.

24. The system of claim 20, wherein the partnering structure includes a partnership identifier for uniquely identifying a partnership between the originating application and the partnering processor, the partnership identifier being determined via the partnering protocol identification message.

25. The system of claim 20, wherein the partnering structure includes an identifier record for storing data contained in the partnering protocol identification message and each originating event message.

26. The system of claim 25, wherein the identifier record of the partnering structure includes a pointer to a queue of at least one event record, each event record being created by the partnering processor in response to each originating event message received by the partnering processor.

27. The system of partnering an originating application and a target application over a network of claim 26, wherein the originating event message contains an originating event code and wherein each event record includes the originating event code contained in the originating event message corresponding to the event record.

28. The system of claim 26, wherein the originating event message transmitted by the originating application includes a data field containing at least one data block, and wherein at least one event record includes a pointer to a queue of at least one data record, the data record containing the at least one data block.

29. A computer program product for enabling partnering between an originating application and a target application over a network, comprising:

computer code that processes a partnering protocol identification message received from the originating application to negotiate an event message protocol of an originating event message to be transmitted by the originating application;

computer code that receives an originating event message from the originating application, the originating event message conforming to the event message protocol, wherein the event message protocol includes a data size and the originating event message includes a data field, and wherein the computer code that processes the originating event message includes computer code that extracts at least one data block from the data field of the originating event message, each data block having a size equal to the data size;

computer code that processes the originating event message to generate a target event message for transmission to the target application;

computer code that transmits the target event message to the target application to cause an action in the target application in response to the target event message; and a computer readable medium that stores the computer codes.

30. A computer program product for enabling partnering between an originating application and a target application over a network, comprising:

computer code that processes a partnering protocol identification message received from the originating application to negotiate an event message protocol of an originating event message to be transmitted by the originating application;

computer code that receives an originating event message from the originating application, the originating event message conforming to the event message;

computer code that processes the originating event message to generate a target event message for transmission to the target application, wherein the computer code that processes the originating event message includes computer code that applies configuration logic to data contained in the originating event message;

computer code that transmits the target event message to the target application to cause an action in the target application in response to the target event message; and a computer readable medium that stores the computer codes.

31. The computer program product of claim 30, wherein the target event message includes a target event code and the configuration logic includes formulations defining the target event code to be generated by the partnering processor in response to the originating event code of the originating event message.

32. The computer program product of claim 30, wherein the computer readable medium is selected from the group consisting of CD-ROM, zip disk, floppy disk, floptical disk, tape, flash memory, system memory, hard drive, application-specific integrated circuit (ASIC), programmable logic devices (PLD), read only memory (ROM), random access memory (RAM), and data signal embodied in a carrier wave.

* * * * *